United States Patent [19]

Goans

[11] Patent Number: 5,308,191
[45] Date of Patent: May 3, 1994

[54] FLOATING BARRIER METHOD AND APPARATUS

[75] Inventor: Kip B. Goans, Harvey, La.

[73] Assignee: Oil Stop, Inc., Harvey, La.

[21] Appl. No.: 19,030

[22] Filed: Feb. 18, 1993

Related U.S. Application Data

[63] Continuation-in-part of Ser. No. 933,721, Aug. 24, 1992, which is a continuation-in-part of Ser. No. 752,002, Aug. 29, 1991, Pat. No. 5,195,844, which is a continuation of Ser. No. 638,704, Jan. 8, 1991, abandoned, which is a continuation of Ser. No. 424,158, Oct. 19, 1989, Pat. No. 5,022,785.

[51] Int. Cl.$^5$ ............................................. E02B 15/04
[52] U.S. Cl. ........................................ 405/68; 405/66; 405/63
[58] Field of Search .................. 405/63, 64, 65, 66, 405/67, 68, 69, 70, 71, 72

[56] References Cited

U.S. PATENT DOCUMENTS

| 3,811,285 | 5/1974 | Ballu | 405/69 |
| 4,068,478 | 1/1978 | Meyers et al. | 405/66 |
| 4,104,884 | 8/1978 | Preus | 405/68 |
| 4,124,981 | 11/1978 | Preus | 405/66 |
| 4,201,495 | 5/1980 | Preus | 405/63 |
| 4,652,173 | 3/1987 | Kallestad | 405/69 |

FOREIGN PATENT DOCUMENTS 2012215  7/1979  United Kingdom .................. 405/63

Primary Examiner—Randolph A. Reese
Assistant Examiner—J. Russell McBee
Attorney, Agent, or Firm—George A. Bode

[57] ABSTRACT

A boom for collecting material floating on the surface of a body of water which, by its configuration, requires considerably less inflation air to achieve the required degree of buoyancy to float the boom than is normally required. One embodiment incorporates an elongated collapsible first tube compartmentalized into a series of sequential compartments. Within such compartments are located inflatable flotation tubing which expands the walls of these compartments thus displacing water, thereby increasing the buoyancy of the boom. Such inflatable floatation tubing may be configured as a longitudinal sequence of inflatable annular rings within these compartments; or, the inflatable floatation tubing may be configured as a spiral coil disposed along the length of the compartments biasing the walls of the compartments outwardly. The inflation tubing can be connected by a conduit to a tube secured to and extending the length of the first tube for providing inflation gas thereto.

18 Claims, 4 Drawing Sheets

FLOATING BARRIER METHOD AND APPARATUS

This application is a continuation-in-part application of a previous application by the same inventor bearing U.S. Ser. No. 07/933,721 filed Aug. 24, 1992, which is a continuation-in-part application of U.S. Ser. No. 07/752,002 filed Aug. 29, 1991, (now U.S. Pat. No. 5,195,844) which is a continuation application of U.S. Ser. No. 07/638,704 (now abandoned) filed Jan. 8, 1991, which is a continuation of U.S. Ser. No. 07/424,158 filed Oct. 19, 1989, now U.S. Pat. No. 5,022,785, issued Jun. 11, 1991.

BACKGROUND OF THE INVENTION

1. Field of the Invention

This invention pertains to a floating boom for collecting floatable material, such as liquid hydrocarbons, floating on the surface of a body of water, and more particularly to an inflatable boom which, through its configuration, requires a small amount of inflation air volume to achieve the buoyancy necessary to float the boom.

2. General Background

Conventional oil booms normally comprise an elongated tubular body, generally produced by inflation of a fluid impervious tube to which is secured a depending oil confining skirt. These booms are normally stored on land or on ship in a collapsed state either by flat folding the collapsed tube or by rolling the collapsed tube on to a reel. See, for example, U.S. Pat. Nos. 2,682,151 and 3,494,132 which disclose a series of inflatable plastic tubes, the ends of which are interconnected by sleeves. Integrally formed on each tube is a depending hollow skirt or fin having a weighted material (for ballast) such as lead shot or chain contained in or attached to the lower longitudinal edge of the fin.

Other patents, such as U.S. Pat. No. 4,123,911, disclose a continuous inflatable tube that must be inflated to achieve the required degree of buoyancy necessary to float the boom. These types of inflatable booms, while functional, require a large volume of pressurized air for inflation and operation. Supplying such pressurized air in a marine environment is both a costly and time consuming procedure. Furthermore, for those designs incorporating one single tube or a series of long single tubes, should a leak occur in the tube, the result would be a total loss of buoyancy in that length of tubing.

An alternate method of achieving the desired degree of water displacement so as to float the boom is disclosed in U.S. Pat. Nos. 4,068,478 and 4,295,755. Both of these patents disclose the use of a pre-shaped spiral wire form that is inserted within the tube during manufacturing. This wire form compresses and is able to slide within the tube so that the boom can be rolled on a reel, yet, when the tube is unrolled, the wire form expands thereby stretching the tube to its desired shape. In order for the tube to expand, there must be vent openings in the tube for the unrestrained movement of air into and out of the tube. Thus, the buoyancy of this boom do not rely upon inflation or pressurization of the tube. Additionally, when the wire form is compressed or wound on the reel for long periods of time, its ability to expand outwardly is decreased, thereby rendering the boom less effective. Furthermore, such wire forms considerably increase the bulk and weight of the boom, thereby requiring more storage space and more water displacement to float the boom. Another drawback is the ability of water to enter the boom through these vent openings, thereby flooding the tube and consequently sinking the boom. Additionally, the consequences of the wire form breaking either during storage or during use should be considered. It might be that a sharp edge will pierce the tube, thereby undermining the buoyancy of the boom.

It is thus an object of this invention to provide a boom that is not bulky when stored, will not lose its expansion capabilities when stored for long periods of time, and does not incorporate wire forms that might break, thereby possibly piercing the tube.

Another object of this invention is to devise a boom that does not require a large volume of inflation air to achieve the desired degree of water displacement.

A further object of this invention includes the ability for one section of the boom to become ruptured without rendering the boom useless or unmanageable.

Another object of this invention is the ability that should water enter this tube through vent openings, the accumulation of such water will not render the boom or this section of the tube ineffective. These and other objects of this invention will become obvious upon further investigation.

SUMMARY OF THE PRESENT INVENTION

The preferred embodiment of the apparatus of the present invention solves the aforementioned problems in a straightforward and simple manner.

This invention pertains to an inflatable float boom for confining material floatable on a liquid surface. One embodiment incorporates first and second elongated tubes that define a flat reelable configuration when collapsed with the second tube being positioned within the first tube. Sealing means separate these first and second tubes into a plurality of adjacent first and second compartments disposed along the length of these first and second tubes. Inflatable floatation means are disposed around the second compartments intermediate the first and second tubes with these floatation means, when inflated, expanding the first compartments thus displacing fluid, thereby increasing the buoyancy of the boom.

BRIEF DESCRIPTION OF THE DRAWING

For a further understanding of the nature and objects of the present invention, reference should be had to the following description taken in conjunction with the accompanying drawing in which like parts are given like reference numerals and, wherein.

DETAILED DESCRIPTION OF THE PREFERRED EMBODIMENT

Figure 1:
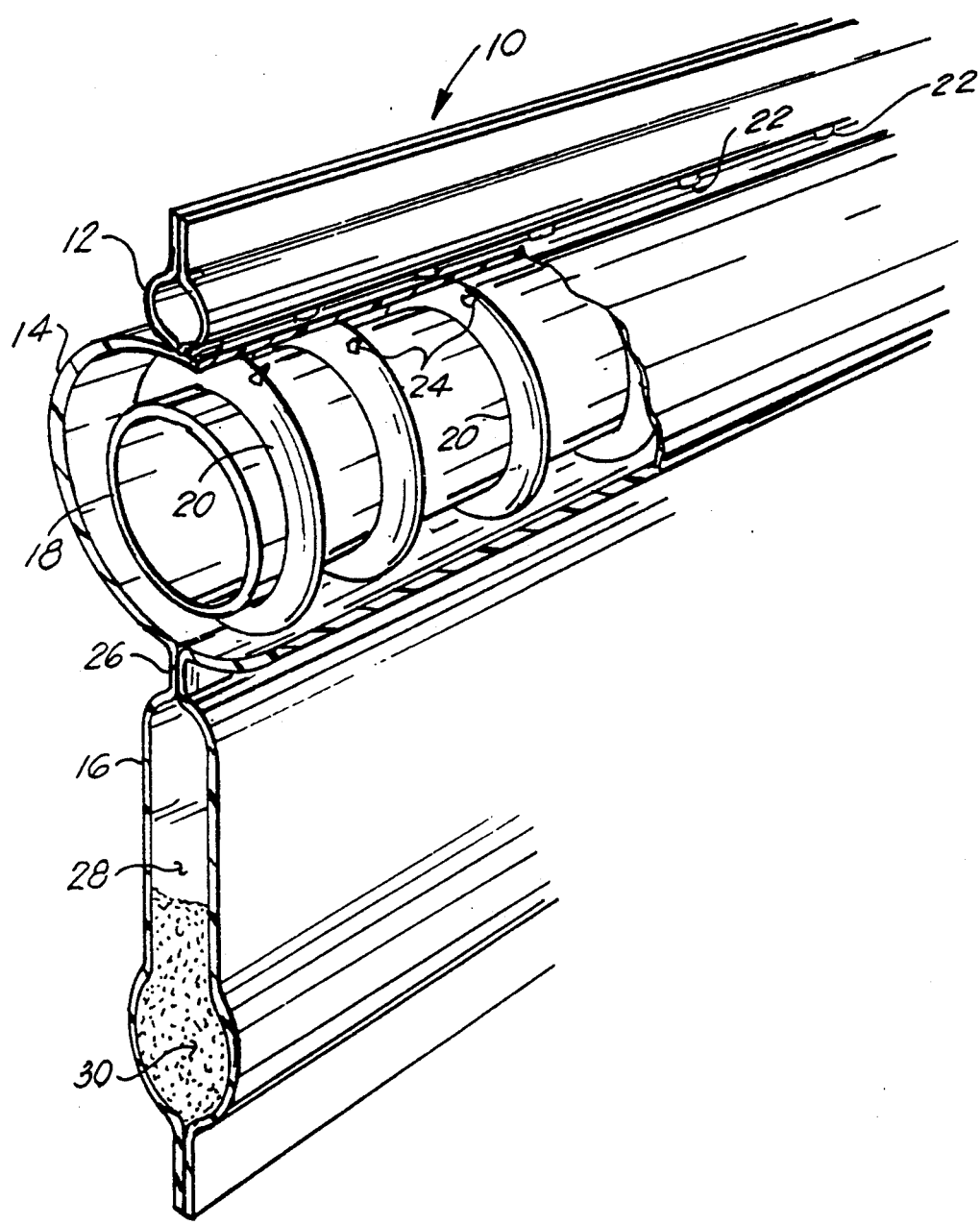
FIG. 1 is a pictorial view, partially broken away, of one embodiment of the invention.

Referring initially to FIG. 1, there is shown boom 10 constructed of fluid impervious material secured together by heat sealing or by any other watertight means. It is preferable for boom 10 to be compartmentalized along its length such that should there be a failure of one compartment of boom 10, the other compartments of boom 10 will not be affected thereby. One such method of constructing and compartmentalizing boom 10 is shown in parent U.S. Pat. No. 5,022,785, such technology hereby being incorporated herein by reference.

In accordance with the embodiment of FIG. 1, boom 10 comprises an upper tube 12, a middle tube 14, and a lower tube 16. Upper tube 12, as discussed in the earlier U.S. Pat. No. 5,022,785, would not be compartmentalized, but instead would be continuous along its length so that it may supply inflation air to the various compartments or components within middle tube 14. In some embodiments, the need for upper tube 12 does not exist and thus there would be no upper tube 12.

Preferably, both middle tube 14 and lower tube 16 would be compartmentalized (although this is not necessary) with each such compartment of middle tube 14 being configured with an inner tube 18. Inner tube 18 need not be concentric with middle tube 14 as is shown in FIG. 1, but this positioning aids in the positioning of annular rings 20 around inner tube 18 between inner tube 18 and middle tube 14. Both inner tube 18 and annular rings 20 are constructed of air tight material that can be pressurized much the same as the material of boom 10.

Inner tube 18 can be pressurized through a variety of means. It can be pressurized via upper tube 12 through a check valve (shown in U.S. Pat. No. 5,022,785 and FIGS. 7 and 8, but not shown in FIGS. 1-6) or through a series of valves (not shown) which may or may not extend through middle tube 14. It is also possible to include a resealable opening (not shown in the wall of middle tube 14 so as to provide direct access to inner tube 18 and annular rings 20.

Annular rings 20 can also be pressurized in much the same manner. They may connect directly with upper tube 12 via conduit 22 and a check valve (not shown in FIGS. 1-6) or they may each contain valve 24 through which inflation air passes. Valve 24 may either extend through the wall of middle tube 14 or access to valve 24 may be through a resealable opening (shown in U.S. Ser. No. 07/933,721 and FIGS. 7 and 8, but not shown in FIGS. 1-6) in middle tube 14. In any event, inner tube 18 and annular rings 20 can both be inflated as needed so as to cause middle tube 14 to expand, thereby displacing fluid in order to increase the buoyancy of boom 10.

It may be desirable to also inflate the individual compartments of middle tube 14 around annular rings 20, but this is optional since the inflation of rings 20 will cause middle tube 14 to conform to a tubular shape without the need for such inflation of these compartments. Additionally, it is possible not to inflate inner tube 18 and to inflate only annular rings 20 in an effort to reduce the volume of inflation air needed to float boom 10. Should this latter option be selected, the amount of inflation air required at the job site will be significantly reduced. However, to accomplish this, vent valves will be needed so that air can enter both inner tube 18 and middle tube 14 during the inflation of annular rings 20 in order that boom 10 can expand to the desired shape. These vent valves (not shown) are needed so that air can be sucked within tubes 14 and 18 during their expansion as a result of the inflation of annular rings 20.

Ideally, annular rings 20 would "float" within their respective compartments of middle tube 14 and would not be connected to either middle tube 14 or inner tube 18. However, this will not always be the case since this will enable the rings 20 to collect or gather in one region of each compartment of middle tube 14. Should this occurs, boom 10 will not be uniformly inflated along its length, thereby reducing its buoyancy. Thus, it is preferable to either attach rings 20 to one or both of middle tube 14 (at its interior wall) and inner tube 18 (at its exterior wall) or to supply a series of walls or stops (not shown) that prevent annular rings 20 from sliding too far out of position along inner tube 18. Preferably, annular rings 20 would be attached only to the exterior wall of inner tube 18, thereby enabling this entire assembly to be inserted within each compartment of middle tube 14 during the manufacturing process. Such attachment can generally be accomplished via heat bonding, but they may also be attached by mechanical means or by other chemical/thermal processes.

Separated from middle tube 14 by longitudinal seal 26 is lower tube 16. Lower tube 16, as stated earlier, is also compartmentalized (although this is not necessary) in much the same manner as described in the parent applications with each such compartment 28 being filled with a granular material 30, such as sand, gravel, or the like. (A suitable equivalent weight such as lead shot or a metal chain may be employed for ballast.) Material 30 has a specific gravity substantially in excess of that of water such that the successively connected compartments 28 will define a depending skirt or fin when boom 10 is deployed onto a body of water.

Figure 2:
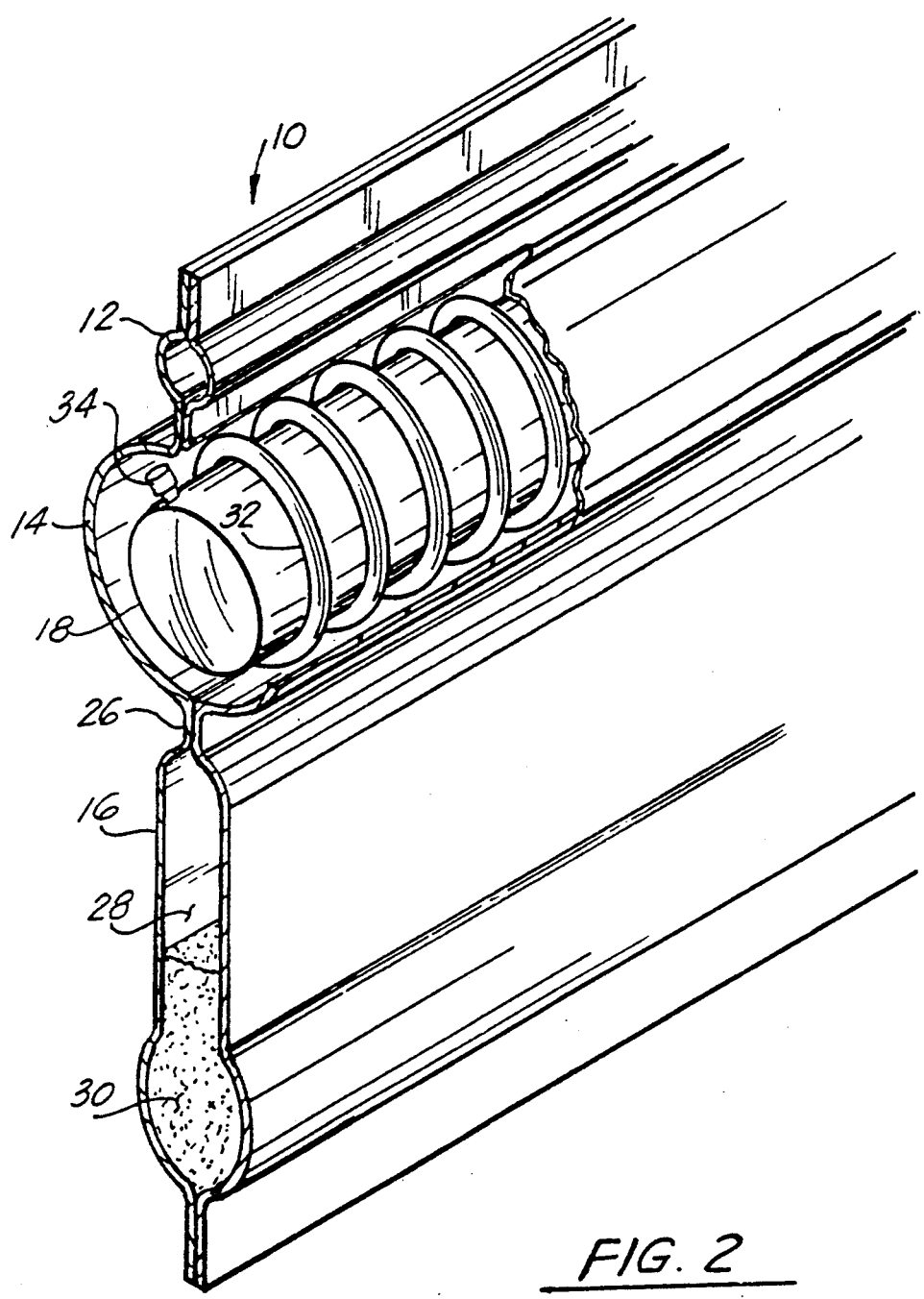
FIG. 2 is a pictorial view, partially broken away, of another embodiment of the invention.
Figure 3:
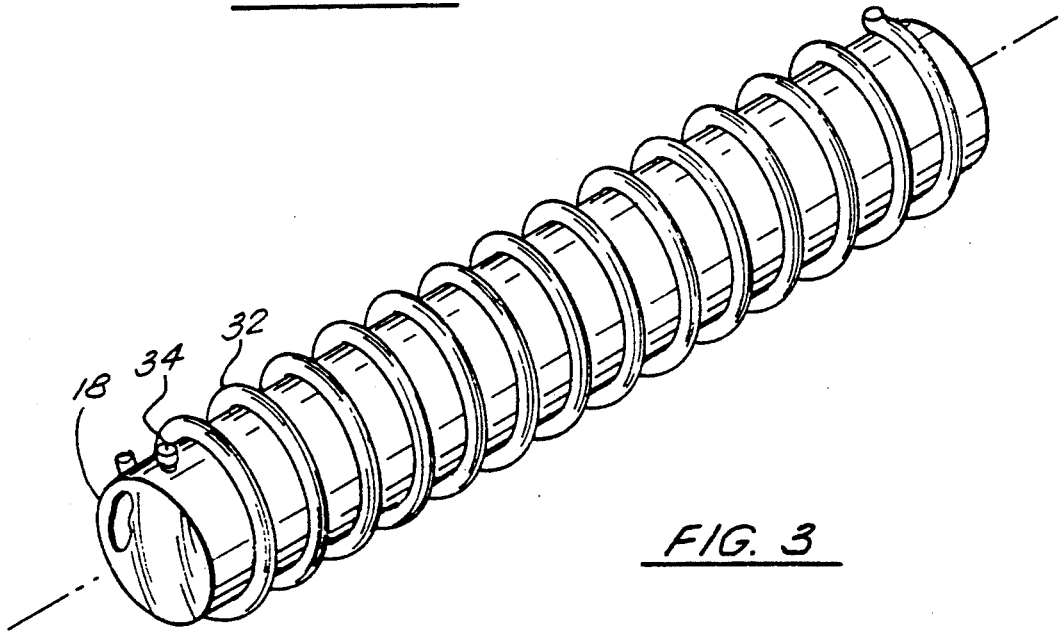
FIG. 3 is a pictorial view, partially broken away, of an interior portion of the embodiment of the invention shown in FIG. 2.
Figure 7:
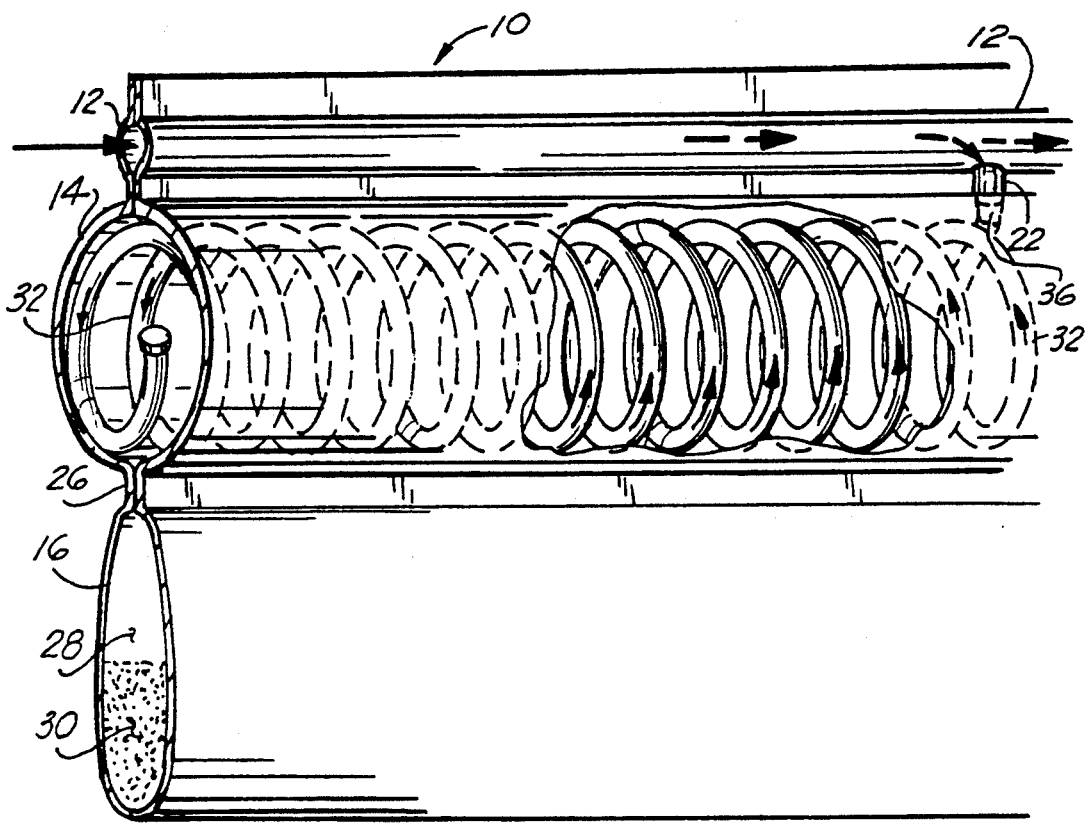
FIG. 7 is a pictorial view, partially broken away, of yet another embodiment of the invention; and, FIG. 8 is an enlarged view of a portion of FIG. 7.

Referring now to FIGS. 2-6, there is shown an alternate or second embodiment of boom 10. In this embodiment, annular rings 20 of FIG. 1 are replaced with an inflatable spiral coil 32 surrounding inner tube 18. Coil 32 is separately inflated from one of its ends with the other end being closed or capped. Consequently, only one valve is needed to inflate coil 32 rather than the numerous valves 24 required for the earlier embodiment that incorporated a plurality of annular rings 20. In this new embodiment, inner tube valve 34 is shown in FIGS. 2, 3 and 7 through which inflation air may be supplied if such is desired. Additionally, one end of inner tube 18 is illustrated in these FIGS. 2-6 as being closed or sealed. One advantage of this embodiment is the fact that coil 32 will be evenly inflated along its entire length, whereas with annular rings 20 of FIG. 1, it is possible for the rings to be pressurized at different rates.

As in the earlier embodiment of FIG. 1, there are several inflation options available with the second embodiment of FIGS. 2-6. First, only coil 32 may be inflated which will cause the wall of middle tube 14 to expand, thereby providing sufficient water displacement to float boom 10. Second, both coil 32 and inner tube 18 may be inflated, thereby providing a back-up means of buoyancy should one of them rupture. Third, coil 32, inner tube 18 and middle tube 14 could all be inflated but this will require a considerably large amount of inflation air at the installation site. Any combination of the above is also possible depending upon the degree of back-up buoyancy desired and the amount of inflation air available.

Figure 4:
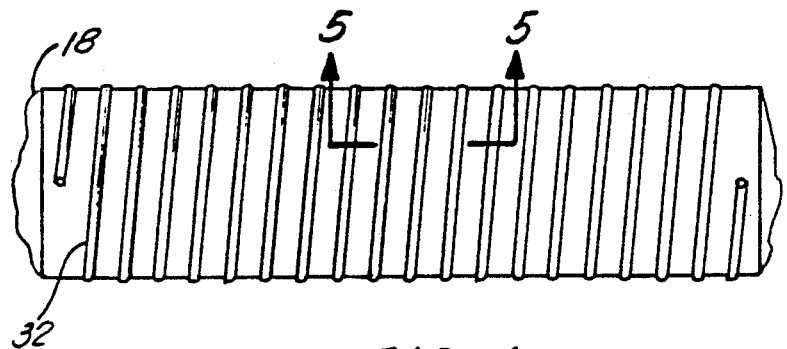
FIG. 4 is a partial plan view of the embodiment of FIG. 3 in its deflated condition.
Figure 6:
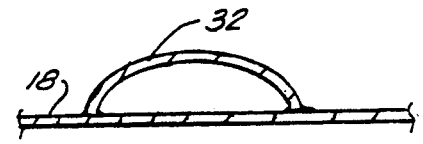
FIG. 6 is an enlarged view of a portion of FIG. 5 shown in its inflated condition.
Figure 5:
FIG. 5 is a sectional view taken along LINES 5—5 of FIG. 4.

Referring now particularly to FIGS. 4 and 5, there is shown an illustration of this second or spiral embodiment in its deflated condition. As can be seen, there is little bulk in this embodiment since it comprises a single spiral strip of air-tight material that is attached to inner tube 18 (See FIGS. 5 and 6). Thus, there is little additional manufacturing costs associated with this second embodiment while at the same time, it provides a unique means of supplying sufficient water displacement without requiring large amounts of inflation air at the installation site. The spiral nature of spiral coil 32 provides rigidity, without bulk, to boom 10 as it is wrapped around inner tube 18, and especially if inner tube 18 is also inflated.

A variation of this second embodiment is to either construct boom 10 such that spiral coil 32 is attached to the inside wall of middle tube 14 or to construct it such that spiral coil 32 is not attached to either middle tube 14 or inner tube 18, thereby enabling it to "float" or move within boom 10 as needed.

Of course, in order to expand middle tube 14 from its collapsed or folded position, vent valves or other means (not shown) for providing air to the interior of middle tube 14 must be provided. If such vent valves are not supplied, it will be difficult for middle tube 14 to expand or fully conform to the inflated position of spiral coil 32.

Figure 8:
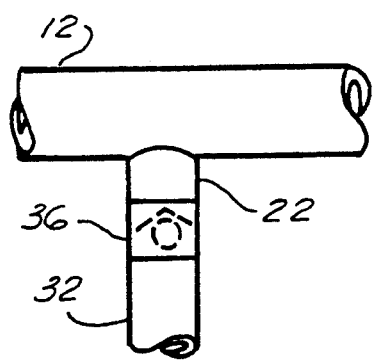

Referring now to FIGS. 7 and 8, there is shown yet another or third embodiment of boom 10. In this third embodiment, inner tube 18 is removed leaving only coil 32 within middle tube 14. A variation of this design is to substitute annular rings 20 for coil 32. In the embodiment shown, coil 32 is inflated via conduit 22 which couples between upper tube 12 and one end of coil 32. As shown in FIG. 8, conduit 22 includes check valve 36 that prevents any leakage out of coil 32 from occurring should the pressure within upper tube 12 drop below the level within coil 32. In this fashion, with there being a number of such coils 32 along boom 10, should one coil 32 fail, there will be others to maintain the buoyancy of boom 10. Additionally, the amount of inflation air required to displace the necessary amount of water to float boom 10 will be significantly reduced since the entire volume of middle tube 14 need not be inflated. Furthermore, spiral coil 32 may be attached to the inner wall of middle tube 14 or spiral coil 32 may be left unattached, thereby allowing it to "float" or freely move within middle tube 14 as needed. It is also possible to inflate middle tube 14 through valve means (not shown) or via upper tube 12 around spiral coil 32 if such is desired for additional buoyancy.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. An inflatable float boom for confining material floatable on a liquid surface comprising:
  a) first and second elongated collapsible tubes formed of fluid impervious material, said first and second tubes defining a flat reelable configuration when collapsed with said second tube located interior of said first tube;
  b) first and second sealing means separating the interior of said first and second tubes into a plurality of adjacent first and second compartments sequentially disposed along the lengths of said first and second tubes; and,
  c) inflatable flotation means disposed around said second compartments intermediate said first and second tubes for expanding said first compartment, thereby displacing fluid and increasing the buoyancy of the boom, said flotation means comprising inflation means extending through said first tube for injecting air into said flotation means, thereby inflating said flotation means around said second compartments, said inflation means comprising a conduit connecting said flotation means to a fourth elongated tube secured to and extending along the length of said first tube.

2. The apparatus of claim 1 further comprising:
  a) a third tube defining a flat reelable configuration when collapsed;
  b) means for sealingly securing a longitudinal edge of said third tube to said first tube;
  c) third sealing means dividing the interior of said third tube into a plurality of adjacent chambers extending along the length of said third tube; and,
  d) a selected quantity of particulate material disposed in each said chamber, said particulate material having a specific gravity substantially greater than that of water.

3. The apparatus of claim 1 wherein each said conduit comprises a check valve for restricting the outward flow of said air from said flotation means through said conduit.

4. The apparatus of claim 3 wherein said flotation means comprise a plurality of spaced annular rings surrounding said second compartments.

5. The apparatus of claim 4 wherein said annular rings are secured to said second tube.

6. The apparatus of claim 5 wherein said second compartments are separately inflatable within said first tube.

7. The apparatus of claim 6 wherein said first compartments are separately inflatable around said second tube and said annular rings.

8. The apparatus of claim 3 wherein said flotation means comprise at least one spiral coil encircling each said second compartment.

9. The apparatus of claim 8 wherein said spiral coil is secured to said second compartment.

10. The apparatus of claim 9 wherein said second compartments are separately inflatable within said first tube.

11. The apparatus of claim 10 wherein said first compartments are separately inflatable around said second tube and said spiral coil.

12. An inflatable float boom for confining material floatable on a liquid surface comprising:
  a) a first elongated collapsible tube formed of fluid impervious material, said first tube defining a flat reelable configuration when collapsed;
  b) sealing means separating the interior of said first tube into a plurality of adjacent first compartments sequentially disposed along the length of said first tube;
  c) a second elongated collapsible tube formed of fluid impervious material and defining a flat reelable configuration when collapsed, said second tube having a substantially smaller diameter when expanded than said first tube with sealing means longitudinally securing said second tube to said first tube; and, d) inflatable flotation means comprising a spiral coil which, when inflated, biases against the wall of said first tube and disposed within said first compartments for expanding said first compartments, thereby displacing fluid to increase the buoyancy of the boom, said flotation means being coupled to said second tube for the supply of air thereto.

13. The apparatus of claim 12 further comprising:
a) a third tube defining a flat reelable configuration when collapsed;
b) means for sealingly securing a longitudinal edge of said third tube to said first tube;
c) additional sealing means dividing the interior of said third tube into a plurality of adjacent chambers extending along the length of said third tube; and,
d) a selected quantity of particulate material disposed in each said chamber, said particulate material having a specific gravity substantially greater than that of water.

14. The apparatus of claim 13 wherein said floatation means are connected to said second tube via a conduit with said conduit comprising a check valve therein to restrict the flow of air from said floatation means.

15. The apparatus of claim 12 wherein said first compartments are separately inflatable around said floatation means.

16. An inflatable float boom for confining material floatable on a liquid surface comprising:

a) a first elongated collapsible tube formed of fluid impervious material, said first tube defining a flat reelable configuration when collapsed;
b) sealing means separating the interior of said first tube into a plurality of adjacent first compartments sequentially disposed along the length of said first tube; and,
c) inflatable flotation means disposed within said first compartments for expanding said first compartments, thereby displacing fluid to increase the buoyancy of the boom, said flotation means being coupled to inflation means for inflating said flotation means and comprising at least one spiral coil within each said first compartment for biasing said first compartment outwardly when inflated.

17. The apparatus of claim 16 wherein said inflation means comprise a conduit connecting said flotation means to a second elongated tube secured to and extending along the length of first tube.

18. The apparatus of claim 17 further comprising:
a) a third tube defining a flat reelable configuration when collapsed;
b) means for sealingly securing a longitudinal edge of said third tube to said first tube;
c) additional sealing means dividing the interior of said third tube into a plurality of adjacent chambers extending along the length of said third tube; and,
d) a selected quantity of particulate material disposed in each said chamber, said particulate material having a specific gravity substantially greater than that of water.

* * * * *